Aug. 2, 1949.  U. LAMM  2,477,990
SATURABLE REACTOR REGULATOR
Filed Aug. 21, 1947  2 Sheets-Sheet 1

INVENTOR.
Uno Lamm
BY
ATTORNEY

Patented Aug. 2, 1949

2,477,990

UNITED STATES PATENT OFFICE 2,477,990

SATURABLE REACTOR REGULATOR

Uno Lamm, Ludvika, Sweden, assignor to Allmänna Svenska Elektriska Aktiebolaget, Vasteras, Sweden, a Swedish corporation Application August 21, 1947, Serial No. 769,942
In Sweden December 13, 1941

Section 1, Public Law 690, August 8, 1946
Patent expires December 13, 1961

5 Claims. (Cl. 323—89)

This invention has for its object to provide improved means for regulating electrically one or other of two related quantities in alternating dependence on two currents representative of the respective quantities by means of one or more direct current saturable reactors—hereinafter referred to as "transductors." The invention is particularly suited for effecting so-called "knee-curve" regulation.

Figure 1:
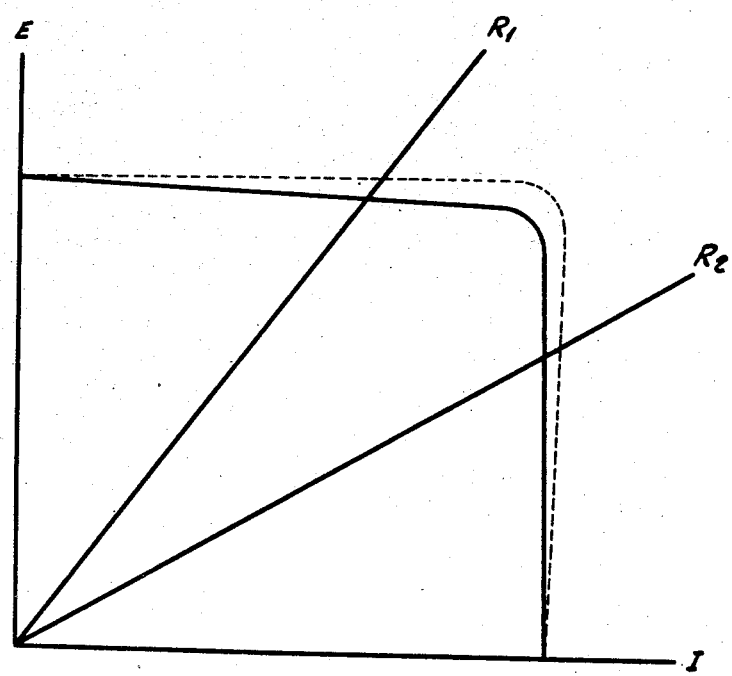
Figure 2:
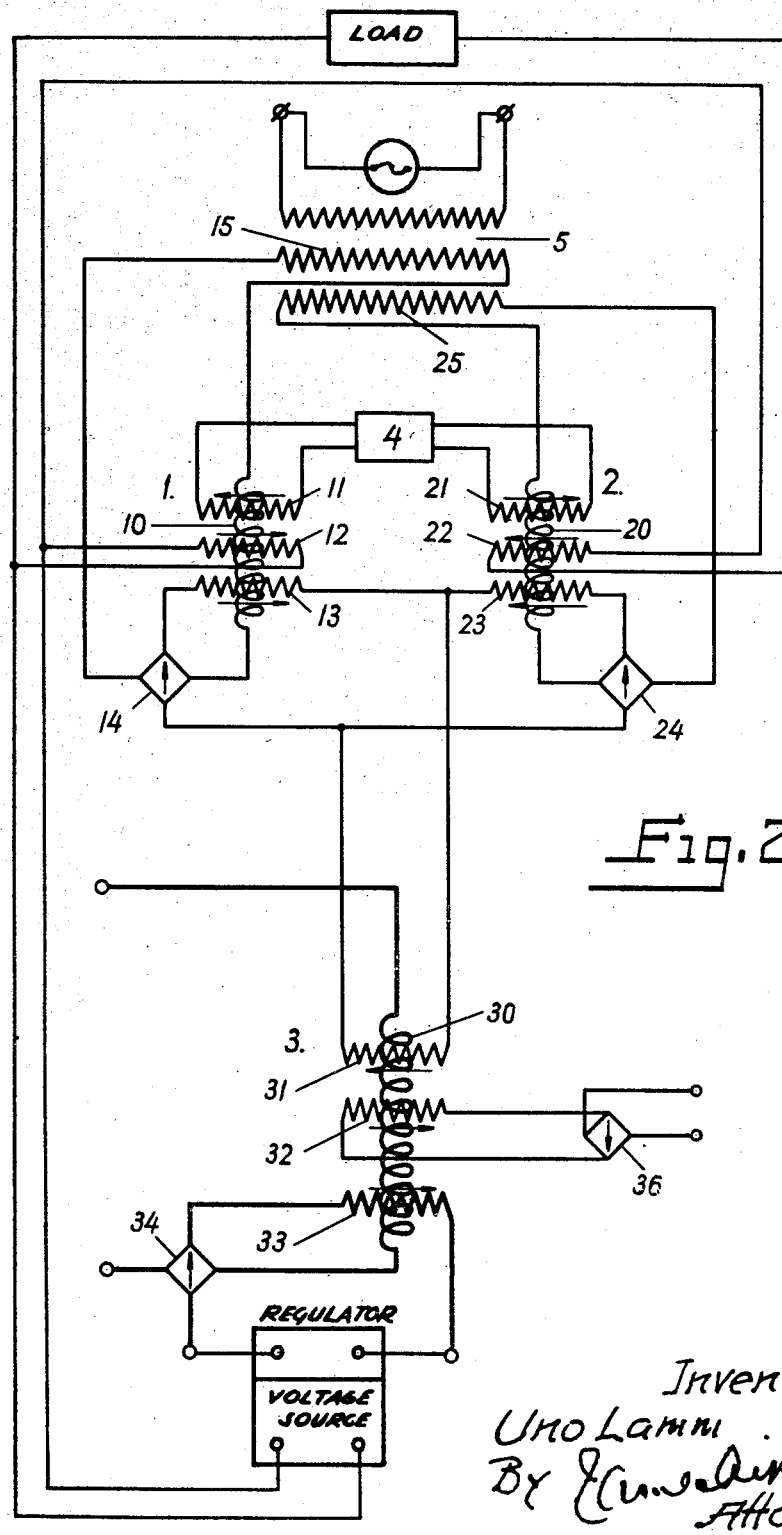

In the accompanying drawings, Fig. 1 is a diagram showing the resistances and voltages and Fig. 2 is a diagrammatic view of the regulating means.

The knee curve regulation is best explained with reference to Fig. 1 of the accompanying drawings. In Figure 1 the abscissas represent the current of an electric circuit, and the ordinates the voltage between the terminals thereof. It is frequently desirable to regulate the voltage to a practically constant value up to a certain current limit but to regulate at the same time the current so that it can never exceed said limit. The regulation curve will then have the form shown and as this curve presents a more or less sharp knee, it is called a "knee curve." The voltage and the current are examples of quantities which depend on each other and which are capable of being kept constant between different limits of regulation but there are of course many other quantities on which such a principle of regulation may be applied. Other examples of knee curve regulation may be found in patent specification No. 2,128,771 and in the British patent specifications 462,757 and 508,230.

According to the present invention, a member executing the regulation is influenced in the same sense by two different currents, which are each derived from one of the aforesaid currents, at least one by the aid of a self-magnetized transductor. The latter is so dimensioned as to admit currents of quite different orders of magnitude when the quantity to be regulated is below its limit value and when it reaches said value, so that the "executing" member is influenced in a quite different manner as soon as the limit value is attained. Preferably both the currents influencing the executing member are derived by the intermediary of such transductors.

According to a preferred form of the invention, the executing member also consists of a transductor, on which the currents derived from the "feeling" quantities act against a predominating magnetization. The latter may also comprise a self-magnetization, so that the alternating current admitted by this transductor is kept low as long as the number of ampereturns of the sum of the aforesaid currents is higher than a constant number of ampereturns counteracting same. In analogy herewith, the self-magnetized transductor or transductors feeding the executing member, whether the latter consists of a transductor or not, are also so arranged that the feeling quantity acts in the same sense as the self-magnetization, while the constant comparison quantity acts in the opposite sense.

The expression "feeling quantity" means an electrical quantity, usually a current, which varies or is caused to vary in accordance with the quantity to be regulated.

A form of the invention arranged in the last-mentioned manner is diagrammatically illustrated in the accompanying drawing.

Two "feeling" transductors are designated by 1 and 2 and their alternating current windings by 10 and 20, respectively. The transductor 1 has a feeling winding 12, which is connected for instance to a voltage to be regulated. It has further a winding 11 fed from an apparatus 4 of a kind known per se so as to supply to the transductor a constant number of ampereturns counteracting the ampereturns from the winding 12, as indicated by the arrows. Finally, it has a self-magnetizing winding 13 fed through a rectifier 14 by the current traversing the alternating current winding 10 of the transductor and acting in the same sense as the feeling winding 12. The self-magnetizing current may, however, traverse the alternating current winding, for instance by applying any one of the connections described in the U. S. Patent No. 2,403,891.

The transductor 2 is essentially analogous to the transductor 1, and its windings are designated by 20, 21, 22, and 23, and the rectifier feeding the last-mentioned winding by 24. The feeling winding is for instance fed by a current which is to be limited to a certain value.

The alternating current windings 10, 20 of the two transductors are preferably fed from separate sources of current, for instance from separate windings 15, 25 of a transformer 5, if it is desired to connect their circuits galvanically on the direct current side and at the same time to employ the same rectifier for the self-magnetization and for feeding the executing member, as has been shown in the drawing and as is described below. If, on the other hand, the transductors feed different windings on the main transductor yet to be described, or if they are provided with separate rectifiers for the self-magnetization, they may be fed from a common current source.

The executing main transductor is designated by 3 and its alternating current winding by 30. It has a regulating winding 31 which is fed by the rectified currents from the two transductors 1, 2 in parallel. Further it has a winding 32 counteracting the winding 31 and fed by an essentially constant current, for instance from the alternating current network through a rectifier 36, and finally it has a self-magnetizing winding 33 fed through a rectifier by the current traversing the alternating current winding 30 of the transductor, said winding acting in the same sense as the winding 32.

The main circuit to be regulated may be directly connected in series with the transductor 3 on the alternating current or direct current side, or the current traversing the transductor may influence a separate regulating device, for instance the exciting winding of a generator or the grid control device of a rectifier. The main transductor may also be replaced by another executing member, preferably influenced in a magnetic way.

The arrangement described and illustrated operates in the following manner. As long as a quantity to be regulated, for instance the voltage influencing the winding 12, remains below a certain value, so that the number of ampereturns of the winding 12 is lower or a trifle higher than the constant number of ampereturns of the winding 11, the transductor 1 keeps the traversing alternating current at a low value. If, on the other hand, the number of ampereturns of the winding 12 rises to a value which exceeds the constant number of ampereturns of the winding 11 by a certain amount depending on the characteristics of the transductor, the latter magnetizes itself strongly by the aid of the winding 13 so as to admit a large alternating current. The conditions will be analogous for the transductor 2 when the quantity influencing this transductor, for instance the main current, is kept below, or exceeds, respectively, a predetermined value.

As long as both of the two quantities to be regulated are kept below their aforesaid limit values, the total current through the regulating winding 31 of the main transductor thus retains a low value. The windings 32 and 33 therefore together maintain a high magnetization of the main transductor so as to cause the latter to admit a higher current than that corresponding to the aforesaid condition for the feeling transductors. Both of the quantities to be regulated cannot therefore be in equilibrium below their limit values under normal conditions, but one of the feeling transductors must always operate at the limit value of the corresponding quantity to be regulated, in order that the number of ampereturns of the winding 31 shall approach the number of ampereturns of the winding 32 and the transductor shall thus perform a regulating action. It depends on the characteristics of the main circuit which of the two feeling transductors predominates over the other. Assuming, for the sake of simplicity, a main circuit of purely ohmic character, the said circuit may either have such a high resistance line $R_1$, Fig. 1 that the voltage reaches its limit value before the current, or such a low resistance line $R_2$, Fig. 1, that the currents come first. In either case it will be the transductor influenced by the quantity lying close to its limit value that sends a considerable current through the winding 31, while the current coming from the other transductor is small in comparison therewith. In this way, either the voltage is kept constant at a comparatively low current or the current is kept constant at a comparatively low voltage, and the result will thus be a so-called knee curve for the relation between current and voltage.

If the self-magnetization of the main transductor is over-dimensioned, the separate counter-magnetization by the winding 32 may be omitted. Such an over-dimensioned self-magnetization implies that the self-magnetizing ampereturns for a certain value of the alternating current exceed those which would be necessary, in the case of a pure current transformer character, to produce the same value of the alternating current. In such case, the transductor cannot be in equilibrium with a pure current transformer character, but magnetizes itself to such a high value that this character is lost, i. e. that the curve giving the relation between alternating current and direct current ampereturns is bent in a downward direction. This corresponds to a high value of the alternating current. If then—by the aid of the winding 31—a certain counter-magnetizing number of ampereturns is introduced, the alternating current would, if sufficient time were available, again sink to a low value, as no intermediary value is stable in the long run. If the primary members of the regulator—especially the transductors 1, 2—operate sufficiently rapidly, the alternating current in the transductor 3 would still be kept floating at an intermediate value which corresponds to the present number of ampereturns in that one of the windings 11, 21 which occasionally determines the regulation.

One advantage of the present invention as compared with earlier devices for a knee curve regulation is that the influence, never entirely vanishing, of the quantity which occasionally does not determine the regulation acts in the opposite direction to the influence of the predominating quantity. If for instance, in the example shown, the winding 12 gives a higher number of ampereturns than the winding 11 and the voltage influencing the first-named winding thus determines the regulation, while the winding 22 has a lower number of ampereturns than the winding 21, the resulting ampereturns of the two latter windings is, however, not entirely inactive. The higher this resulting number of ampereturns, the higher is also the total number of ampereturns in the transductor 2, although it does not by far equal the number of ampereturns in the transductor 1, which is reinforced by the self-magnetization. This means for the eventual regulation that for a larger current, thus a lower number of ampereturns in the transductor 2, the transductor 1 must admit somewhat more current in order to accomplish the same result in the main transductor 3, i. e. the device regulates to a higher voltage, dotted curve of Fig. 1. The regulator thus obtains an inherent tendency of positive compounding, which counteracts the natural tendency of negative compounding which every regulator possesses on account of its droop. By an appropriate mutual dimensioning of the windings, any one of these tendencies can be made predominate, or they may entirely compensate each other, so that the voltage is kept exactly constant without any special compounding measures. In an analogous manner, the current or any other quantity influenced by the regulator may be kept exactly constant within the limits where the said quantity determines the regulation, (dotted curve of Fig. 1).

Another advantage of the present invention, especially as compared with such connections in which the alternative domination of different feeling quantities depends on the use of blocking valves, is that it operates substantially independently of the curve shape of the currents to be regulated, while higher harmonics of the current may act disturbing in arrangements of the just-mentioned kind. This disturbance especially manifests itself by making the knee of the curve less sharp. A similar action is likely to present itself in such previously proposed devices in which the alternative domination of one or the other feeling quantity depends on the series connection of two transductors, if these are provided with self-magnetization.

In the drawings the transductors are conventionally represented throughout in such manner that the alternating current winding is shown as a simple reactor, while the saturating direct current windings are drawn perpendicular thereto and their mutual saturating senses are shown by arrows (two windings opposing each other having the arrows oppositely directed).

I claim as my invention:

1. Electric regulating means, comprising a regulating member capable of being influenced by electric currents, a plurality of means feeding different currents to said member and influencing it in the same sense, a direct current saturable reactor included in at least one of said feeding means, means causing an alternating current to traverse said reactor, saturating means for the reactor, and means feeding to the said saturating means a rectified current substantially proportional to said traversing alternating current.

2. Electric regulating means comprising a regulating member capable of being influenced by electric currents, at least two direct current saturable reactors feeding different currents to said member and influencing it in the same sense, means causing alternating currents to traverse said reactors, saturating means for said reactors, and means feeding to said saturating means rectified currents substantially proportional to said traversing alternating currents.

3. Electric regulating means, comprising a direct current saturable reactor, saturating means therefor, at least two saturating components therefor acting in the sense opposite to that of said saturating means, a rectifier having direct current outputs feeding at least one of said saturating components, a second direct current saturable reactor feeding the alternating current inputs of said rectifier, saturating means for the second reactor, and means feeding to the saturating means of the second reactor, a rectified current substantially proportional to the alternating current traversing said second reactor.

4. Electric regulating means, comprising a direct current saturable reactor, means causing an alternating current to traverse the reactor, saturating means for the reactor, means feeding said saturating means, at least in part, by a rectified current substantially proportional to said traversing alternating current, at least two saturating components acting in the sense opposite to that of said saturating means, a rectifier having direct current outputs feeding at least one of said saturating components, a second direct current saturable reactor feeding the alternating current inputs of said rectifier, saturating means for said second reactor, and means feeding to the saturating means of the second reactor a rectified current substantially proportional to the alternating current traversing the second reactor.

5. Electric regulating means, comprising a regulating member capable of being influenced by electric currents, means feeding to said member at least two currents influencing such member in the same sense, a direct current saturable reactor included in at least one of said feeding means, means causing an alternating current to traverse said reactor, and saturating means for the reactor comprising a substantially constant component, a second component opposing the first component and being proportional to the quantity to be regulated, and a third component also opposing the first component and being substantially proportional to the alternating current traversing the reactor.

UNO LAMM.

No references cited.